(12) United States Patent
Champion et al.

(10) Patent No.: US 7,045,244 B2
(45) Date of Patent: May 16, 2006

(54) FUEL CELLS UTILIZING NON-POROUS NANOFILM MICROCHANNEL ARCHITECTURE

(75) Inventors: David Champion, Lebanon, OR (US); Gregory S. Herman, Corvallis, OR (US); James O'Neil, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 256 days.

(21) Appl. No.: 10/166,999

(22) Filed: Jun. 10, 2002

(65) Prior Publication Data

US 2003/0228508 A1 Dec. 11, 2003

(51) Int. Cl.
*H01M 8/12* (2006.01)
*H01M 8/02* (2006.01)

(52) U.S. Cl. .......................... 429/34; 429/30
(58) Field of Classification Search ............... 429/30, 429/33, 38, 12, 13, 34
See application file for complete search history.

(56) References Cited

U.S. PATENT DOCUMENTS

| 4,248,941 A | * | 2/1981 | Louis et al. ............. 429/13 |
| 4,652,501 A | | 3/1987 | Bennetto et al. |
| 4,883,497 A | * | 11/1989 | Claar et al. ............. 29/623.5 |
| 4,937,152 A | * | 6/1990 | Sato et al. ............. 429/30 |
| 4,988,283 A | | 1/1991 | Nagasawa et al. |
| 5,824,429 A | * | 10/1998 | Das et al. ............. 429/44 |
| 6,007,683 A | | 12/1999 | Jankowski et al. |
| 6,096,448 A | | 8/2000 | Wilkinson et al. |
| 6,210,820 B1 | | 4/2001 | Knights et al. |
| 2002/0195335 A1 | * | 12/2002 | Cisar et al. ............. 204/283 |

FOREIGN PATENT DOCUMENTS

WO WO0045457 8/2000

OTHER PUBLICATIONS

Holmgren, et al., "A Model of Oxygen Transport in Pt/Ceria Catalysts from Isotope Exchange", Journal of Catalysis, 182:441-448, 1999.
Kelley S C et al: "A Miniature Methanol/Air Plymer Electrolyte Fuel Cell" Electrochemical & Solid-State Letter IEEE Service Center vol. 3 No. 9 Sep. 2000 pp. 407-409.
Priestnall M A et al: "Compact Mixed-Reactant Fuel Cells" Journal of Power Sources, Elsevier Sequoia S.A. Lausanne, CH vol. 106, No. 1-2 Apr. 2002 pp. 21-30.

* cited by examiner

*Primary Examiner*—Gregg Cantelmo

(57) ABSTRACT

The invention is a fuel cell comprising a cathode film having a side surface, an anode film having a side surface and an electrolyte film disposed between the cathode film and the anode film and having a side surface. The anode, cathode and electrolyte side surfaces are coplanar. Protons generated at the anode diffuse along the anode side surface, the electrolyte side surface or both towards the cathode side surface. Oxygen ions generated at the cathode diffuse along the cathode side surface, the electrolyte side surface, or both towards the anode side surface.

20 Claims, 8 Drawing Sheets

US 7,045,244 B2

FUEL CELLS UTILIZING NON-POROUS NANOFILM MICROCHANNEL ARCHITECTURE

FIELD OF THE INVENTION

This invention relates to fuel cells, including those that rely on proton transport, and more specifically, to single chamber fuel cells fabricated from nonporous nanolayers.

BACKGROUND OF THE INVENTION

Fuel cells are typically fabricated as multi-layered structures including many cathode-electrolyte-anode unit cells to increase the voltage generated. Typical electrolyte membranes for solid oxide fuel cells are deposited at a rate of 5 nm/min. In addition, to maintain the mechanical integrity of the device, electrolyte layers greater than 10 micrometers thick are generally used. As a result, deposition times of more than two hours may be required for a complete fuel cell. The thick electrolyte layers also increase the resistance to ion conduction within the fuel cell. Thus, the factors which increase the mechanical integrity of the fuel cell also increase fabrication time and reduce fuel cell efficiency, increasing the amount of fuel that must be consumed to generate a given amount of electricity. This makes fuel cells expensive for use in some applications that require medium or high voltage. While fuel cells may be combined to increase the available energy, they are bulky and require flammable fuels such as hydrogen or methane. As a result, there are both practical and safety limits to the size of a fuel cell that may be used with a particular device.

SUMMARY OF THE INVENTION

The invention is a fuel cell comprising an anode layer, a cathode layer, and an electrolyte layer disposed between them. The electrolyte layer is sufficiently thin that surface diffusion is the predominant mode of ionic transport. In one embodiment, the fuel cell comprises a cathode film having a side surface, an anode film having a side surface and an electrolyte film disposed between the cathode film and the anode film and having a side surface. The anode, cathode and electrolyte side surfaces are coplanar. Ions generated at one electrode diffuse along the electrode side surface, the electrolyte side surface, or both towards the other electrode side surface.

BRIEF DESCRIPTION OF THE DRAWING

The invention is described with reference to the several figures of the drawing, in which.

DETAILED DESCRIPTION OF THE PREFERRED EMBODIMENT

The invention includes a fuel cell comprising at least one anode layer, at least one cathode layer, and an electrolyte layer disposed between the anode and the cathode. The electrolyte layer should be sufficiently thin that ionic transport across the electrolyte is dominated by surface diffusion. The invention may be exploited in a variety of fuel cell types. For example, proton exchange membrane fuel cells, solid oxide fuel cells, solid acid, and other derivatives of these fuel cells will benefit from the techniques of the invention. The invention also includes an anode and cathode film disposed on either side of an electrolyte film or a plurality of alternating anode and cathode films interspersed with electrolyte films having coplanar side surfaces. Protons generated at the anode diffuse along the anode side surface, the electrolyte side surface, or both towards the cathode side surface. Oxygen ions generated at the cathode diffuse along the cathode side surface, the electrolyte side surface, or both towards the anode side surface.

Typical fuel cells are fabricated as a sandwich of an anode layer, an electrolyte membrane and a cathode layer. Interfacial layers may also be added between the anode or cathode and the electrolyte. However, the architecture of the device is limited by the mechanical performance of the layers. The electrolyte layer in traditional fuel cells are 10 µm thick or greater to ensure that they will be sufficiently mechanically and thermally robust. While impedance decreases linearly with decreasing thickness, thin electrolyte membranes are extremely fragile. In addition, for dual chamber systems, the electrolyte must prevent the diffusion of the fuel and air through the membrane. Porous electrode films are employed to facilitate ionic diffusion during power generation and increase the triple-phase boundary area. However, the porous electrode films are difficult to produce, and the multigrain structure introduces interfacial impedance to the device. Robustness and difficulty of fabrication are also a concern in alternative configurations where porous anode or cathode substrates are employed to support electrolyte films.

Figure 1:
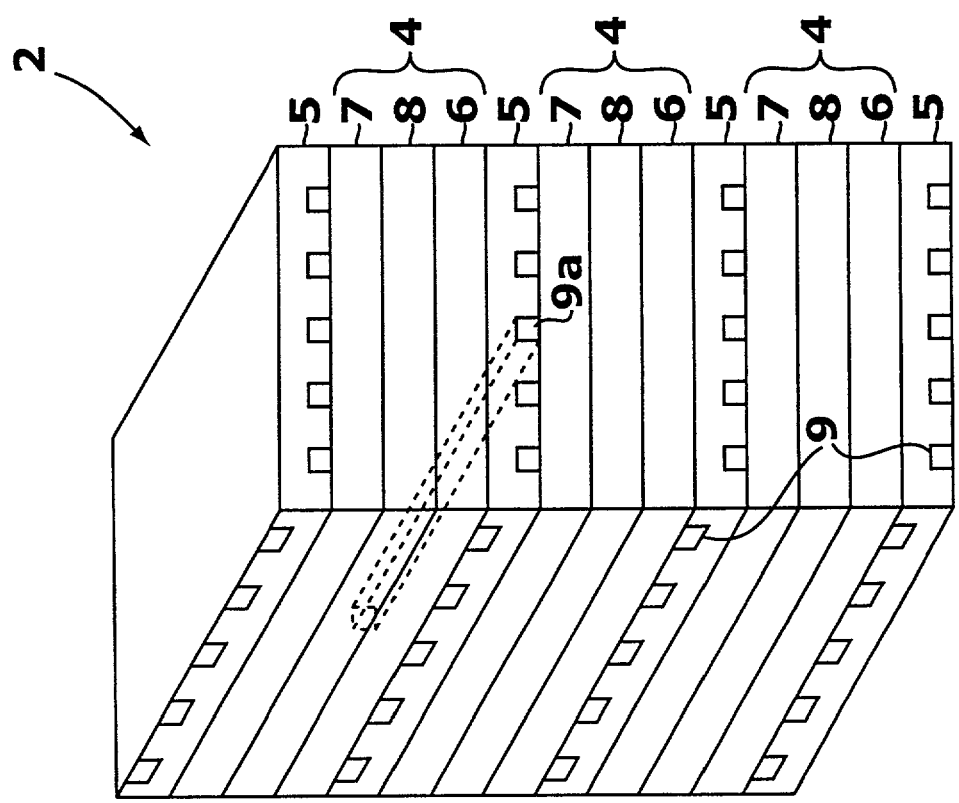
FIG. 1 is a schematic diagram of a typical stack in series for a fuel cell.

Because the voltage generated by a single anode-electrolyte-cathode sandwich or primitive element is small, fuel cells generally include stacks 2 comprising many primitive elements 4 connected in series (FIG. 1). To increase current from the fuel cell stack, the primitive elements may be connected in parallel. Bipolar plates 5 are inserted at the ends of the stack 2 and between adjacent catalytic layers to collect current at the surface of the cathode 6 and anode 7. Channels 9 in the bipolar plates 5 feed the appropriate gases to the catalytic anode 7 and cathode 6 layers on either side. Channel 9a indicates how the channels pass through the stack. However, the oxygen ions generated at the cathode 6 must diffuse through the entire catalyst and electrolyte layer 8 to reach the anode 7 and react with hydrogen or hydrocarbon to form water, electrons, and, in the case of a hydrocarbon fuel, carbon dioxide. Diffusion of oxygen ions through the bulk electrolyte significantly contributes to the impedance of the fuel cell, reducing efficiency. Typically high operating temperatures are used to reduce the impedance.

This invention exploits surface diffusion of oxygen ions and protons across a standard electrolyte material, for example, 20 mole % Sm-doped $CeO_2$. One skilled in the art will realize that other oxygen ion or proton conducting electrolytes may be employed. At low temperatures (~400 degrees C.), surface diffusion of oxygen ions across the electrolyte surface is six orders of magnitude greater than bulk diffusion (Holmgren, et al., 1999, *J. Catal.*, 182:441). When compared to bulk diffusion, surface diffusion reduces ionic impedance in the device resulting from diffusion of oxygen ions and protons, increasing performance while allowing reduced operating temperatures.

Figure 2A:
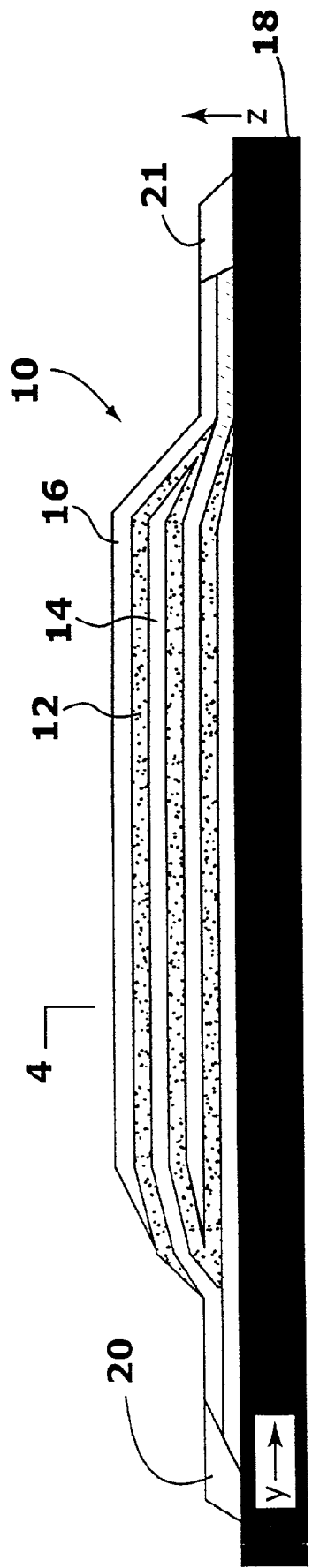
FIG. 2A is a view of a fuel cell stack in parallel along the x-axis according to an embodiment of the invention.

FIG. 2A is a side view of a fuel cell having stack 10. The stack 10 is formed of layers of electrolyte film 12, cathode film 14, and anode film 16 resting on a substrate 18 such as silicon, although other substrates may be used. While the figure shows a cathode film 14 on the bottom adjacent to substrate 18, one skilled in the art will recognize that the layers could easily be formed with anode film 16 or electrolyte film 12 adjacent to the substrate 18. The films are fabricated so as to connect the cathode and anode layers to cathode current collector pad 20 and anode current collector pad 21. Exemplary current collector materials include gold and platinum. The electrolyte film 12 has a sloping edge where the cathode and anode films 14 and 16 slope to their respective collector pads 20 and 21 to relieve film stresses and ensure uniform film coverage and material isolation. The stack 10 may include many multiples of primitive elements (anode-electrolyte-cathode sandwiches) separated by electrolyte layers. The electrolyte 12 should have sufficiently high dielectric constant and breakdown characteristics to avoid conduction of electrons through the electrolyte film 12 between the cathode film 14 and the anode film 16; otherwise, the film may be as thin as a few nanometers. Ease of manufacturing and materials performance are the primary constraints on thickness.

Figure 2B:
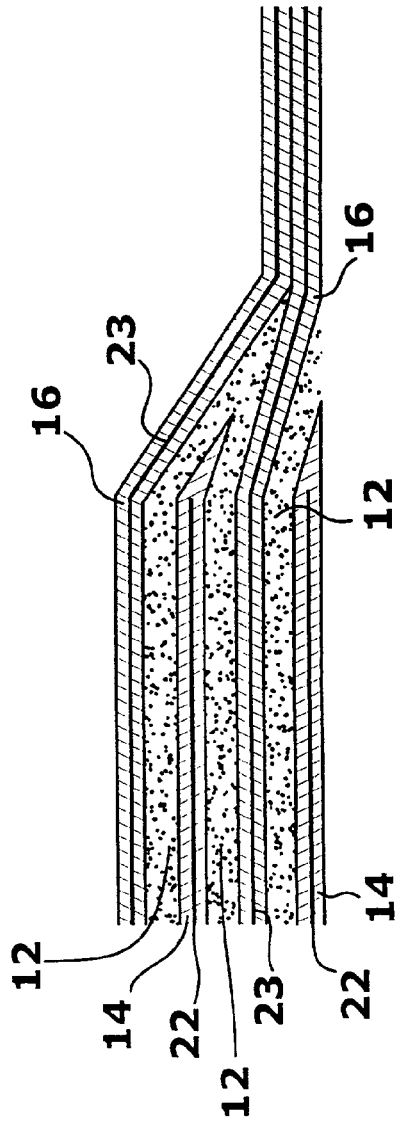
FIG. 2B is an exploded view of a portion of the fuel cell illustrated in FIG. 2A.
Figure 2C:
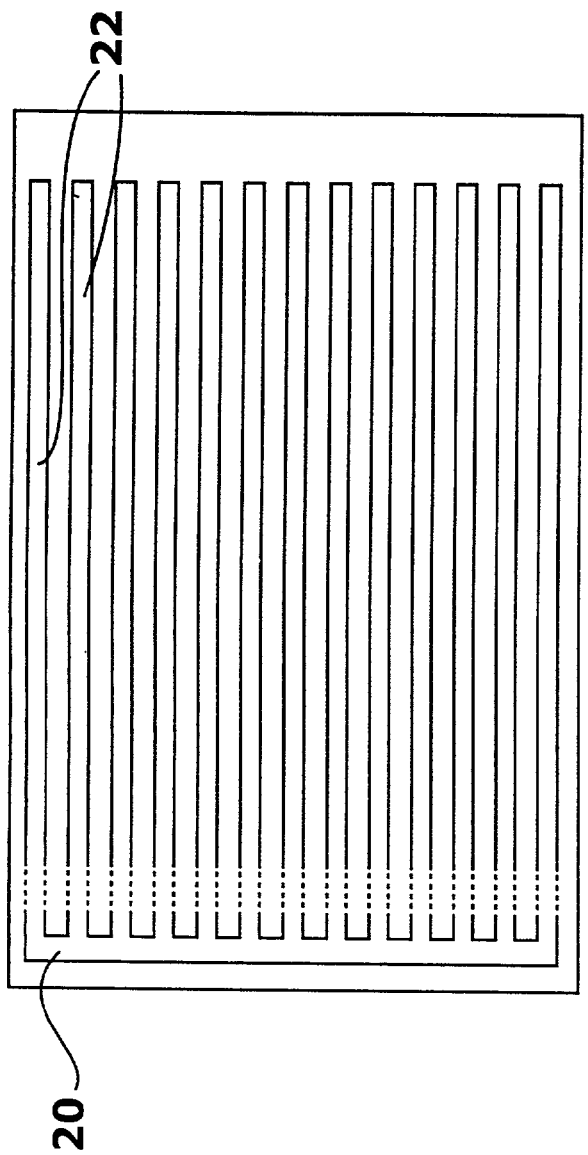
FIG. 2C is a top view of a cathode collector and cathode collector base, in which the dotted line indicates a slant out of the page.
Figure 2D:
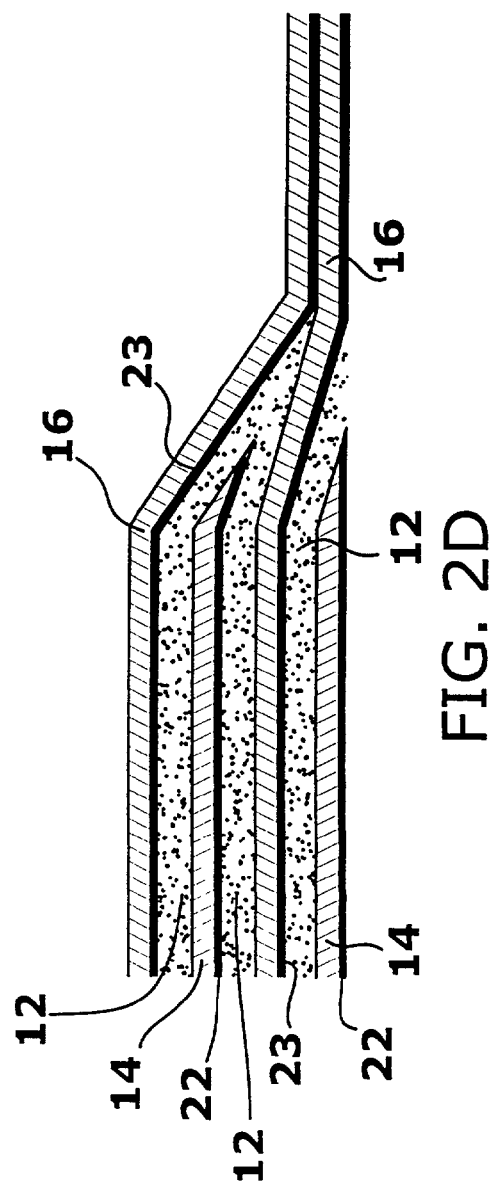
FIG. 2D is an exploded view of an alternative embodiment of the fuel cell illustrated in FIG. 2A.

The cathode and anode collectors 22 and 23 are parallel to the y-axis and are preferably sandwiched into the cathode and anode films, as shown in FIG. 2B, an exploded view of a portion of the stack 10 shown in FIG. 2A. For each electrode layer, the collector is disposed within the layer by depositing half the electrode layer, depositing the collector material, and depositing the rest of the electrode layer. The collector should extend along nearly the entire length of the stack but the anode and cathode collectors must be electrically isolated from one another. The collector layer may define a comb within each electrode layer, as shown in FIG. 2C, a top view of the collector. The "tines," cathode collectors 22, extend from cathode current collector pad 20, which are parallel to the x-axis. The collectors may also be disposed between the electrode and electrolyte layers (FIG. 2D).

Figure 3:
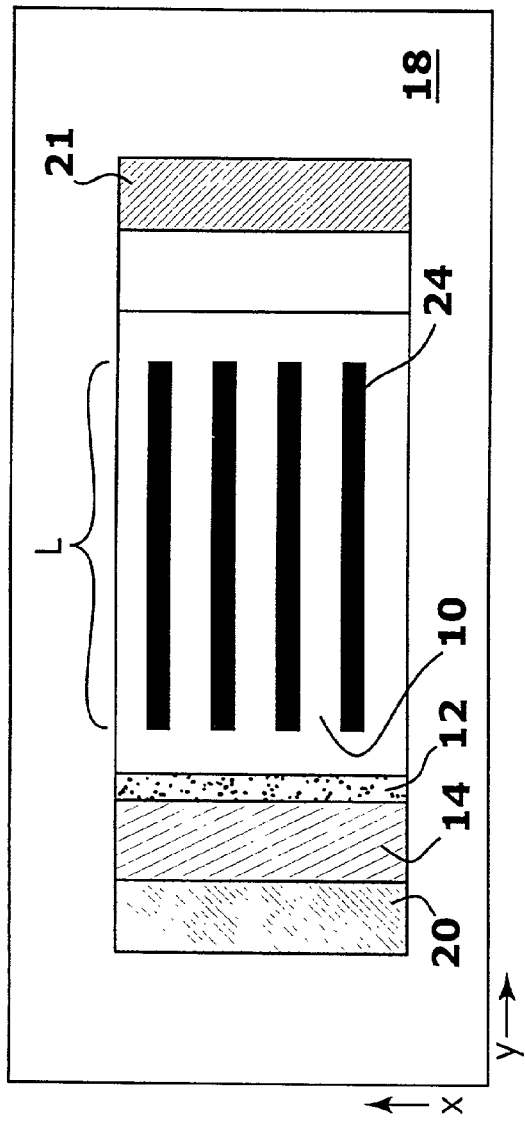
FIG. 3 is a view of the fuel cell stack shown in FIG. 2 along the z-axis.
Figure 4:
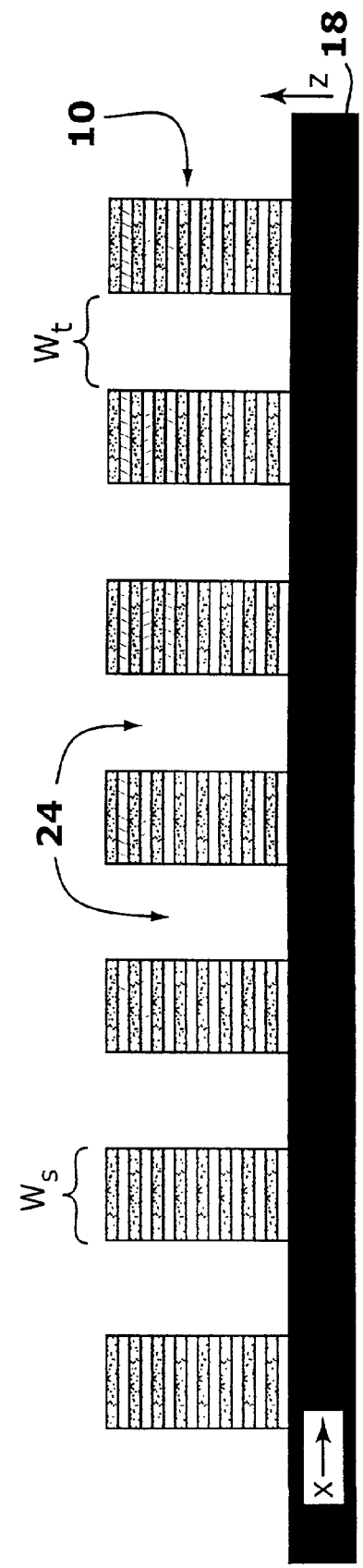
FIG. 4 is a view of the fuel cell stack illustrated in FIG. 2A along the section indicated by 4—4.

FIG. 3 shows trenches 24 running between the anode current collector pad 21 and cathode current collector pad 20, parallel to the x-axis. The trenches provide a path for an air/fuel mixture and exhaust to flow between the stacks 10 and expose the active surfaces (i.e., the catalytic surfaces of the anode and cathode) and the surface of the electrolyte to allow surface diffusion of oxide ions and protons. FIG. 4 is a side view perpendicular to the view of FIG. 2, showing the trenches 24 within the stacks 10. The current collectors are omitted to show the trenches 24.

Figure 5:
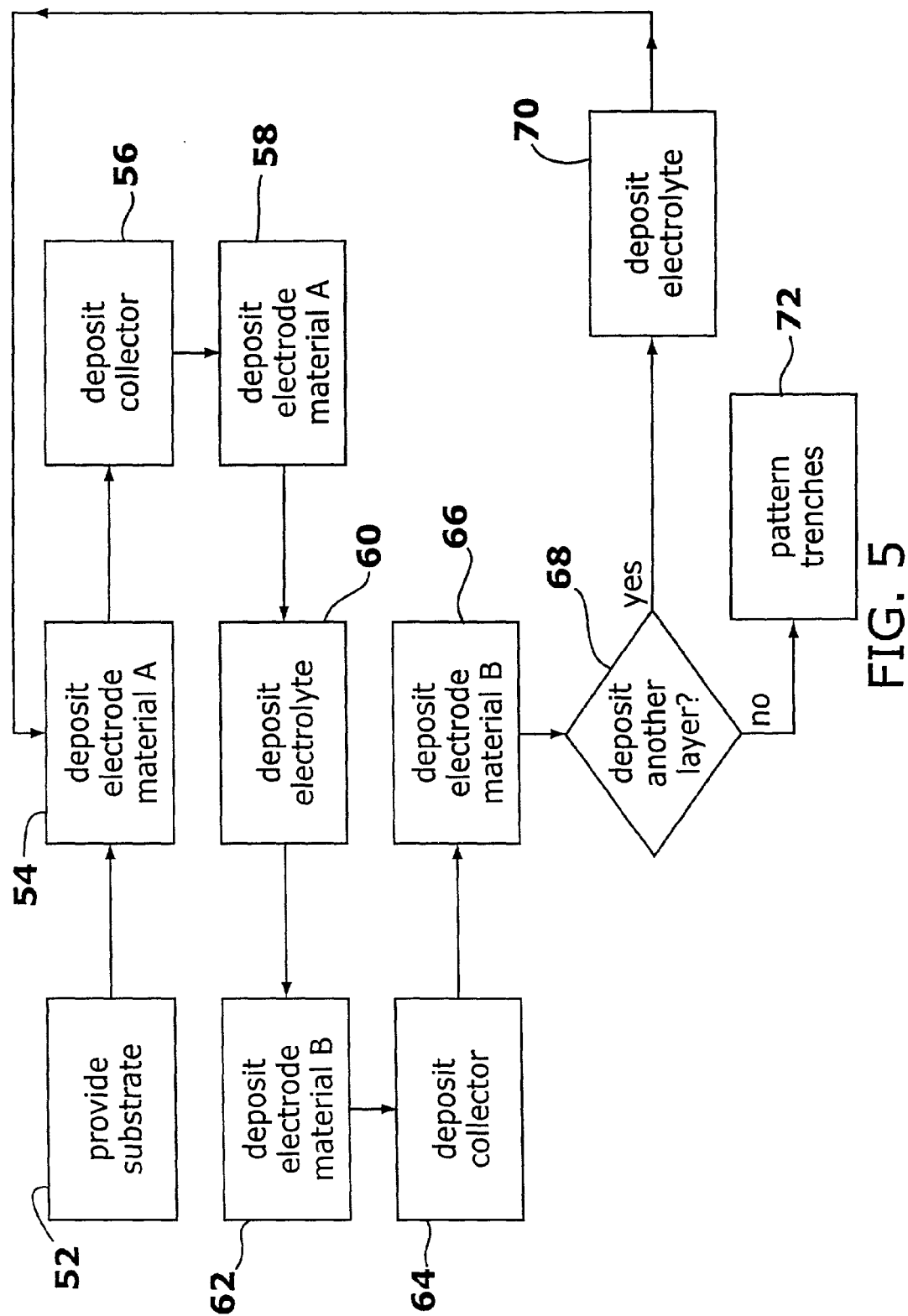
FIG. 5 is a flow chart illustrating a method of making a fuel cell according to an embodiment of the invention.

The stack 10 may be formed by depositing layers of selective catalysts for the cathodes and anodes and suitable oxygen ion/proton conductors for the electrolyte. Sawing, etching, milling, lift off or other means may be used to remove the materials to form the trenches. FIG. 5 illustrates an exemplary method for producing a fuel cell according to one embodiment of the invention. A substrate is provided 52 and an electrode material A deposited thereon 54. As noted above, electrode material A may be either the cathode or the anode. Once approximately half a layer of electrode material A is deposited, a collector is deposited 56, followed by the remainder of electrode material A 58. An electrolyte layer is then deposited 60, followed by a sandwich of electrode material B (62 and 66) and its collector 64. If another fuel cell layer is desired 68, an electrolyte layer is deposited 70 and the process repeated. Once all the layers are deposited 68, trenches are patterned 72 to provide a path for air and fuel to flow through the fuel cell.

One skilled in the art will recognize that a variety of electrode and electrolyte materials may be exploited for use with the invention. For example, cubic fluorites such as Sm- or Gd-doped $CeO_2$ and yttria-stabilized zirconia (YSZ, e.g., 8 mole %), doped perovskite oxides such as $La_{0.9}Sr_{0.1}Ga_{0.8}Mg_{0.2}O_3$, proton conducting perovskites such as $BaZrO_3$, $SrCeO_3$, and $BaCeO_3$, other proton exchange ceramics, or even ion exchange polymers such as Nafion™ (DuPont) may be used as electrolytes in fuel cells of the invention. Metallic cathodes and anodes, e.g., silver and nickel, may be employed. Cermets such as Ni—YSZ, and Cu—YSZ (catalyst-electrolyte), or Ni or Cu modified doped ceria (e.g., $Ce_{0.8}Sm_{0.2}O_{1.9}$, $Ce_{0.9}Gd_{0.1}O_{1.9}$) may be employed as anodes. Exemplary cathodes include doped perovskites-such as $Sm_{0.5}Sr_{0.5}CoO_3$, $Ba_{0.8}La_{0.2}CoO_3$, and $Gd_{0.5}Sr_{0.5}CoO_3$. Alternatively, the B sites of these perovskites may be doped, for example, with Fe or Mn. The electrolyte, cathode, and anode may be porous or dense. As used herein, a dense material has at least 80% of its theoretical density.

The dimensions of the fuel cell are preferably optimized to allow the fuel/air mixture to circulate between the stacks 10 and maximize the surface area of each stack and the total catalytic surface area of the fuel cell. The trench length L, trench width $W_t$, and stack width $W_s$ are coordinated to allow the fuel/air mixture and exhaust to flow through the trenches 24 and maximize the surface area of the stacks 10 without jeopardizing their mechanical strength. In one embodiment, the total width of one stack 10 and the adjacent trench 24 is 1 μm, allowing 10,000 trenches/cm.

Figure 6A:
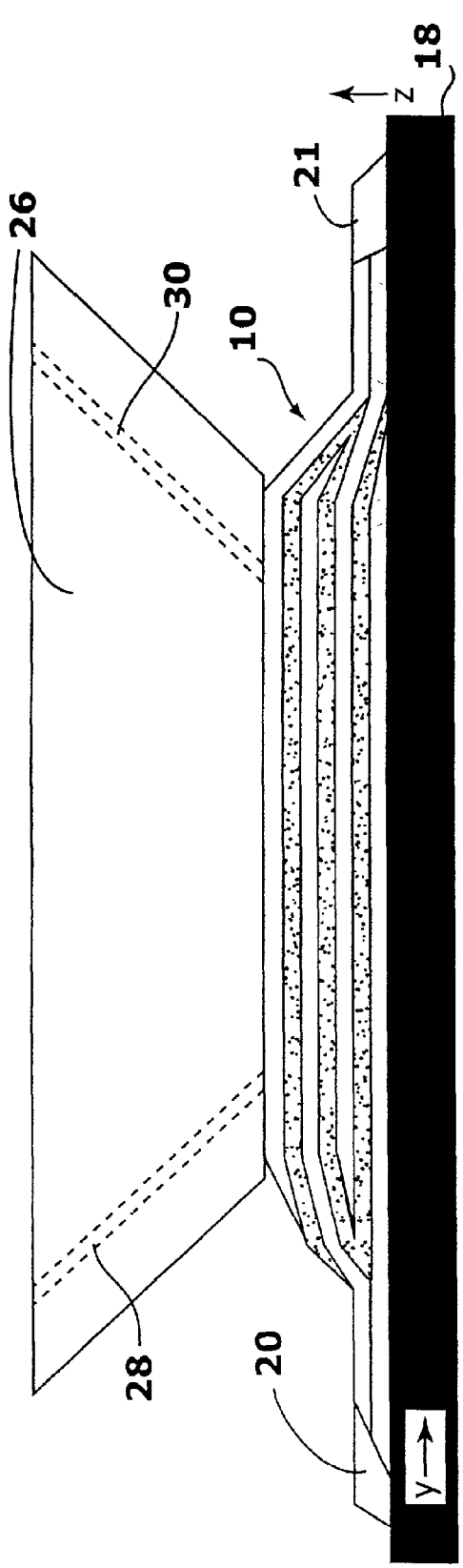
FIGS. 6A and 6B are side views of the fuel cell illustrated in FIG. 2A along the x- and y-axes, respectively, showing how air and fuel are circulated around the stack in the trenches.
Figure 6B:
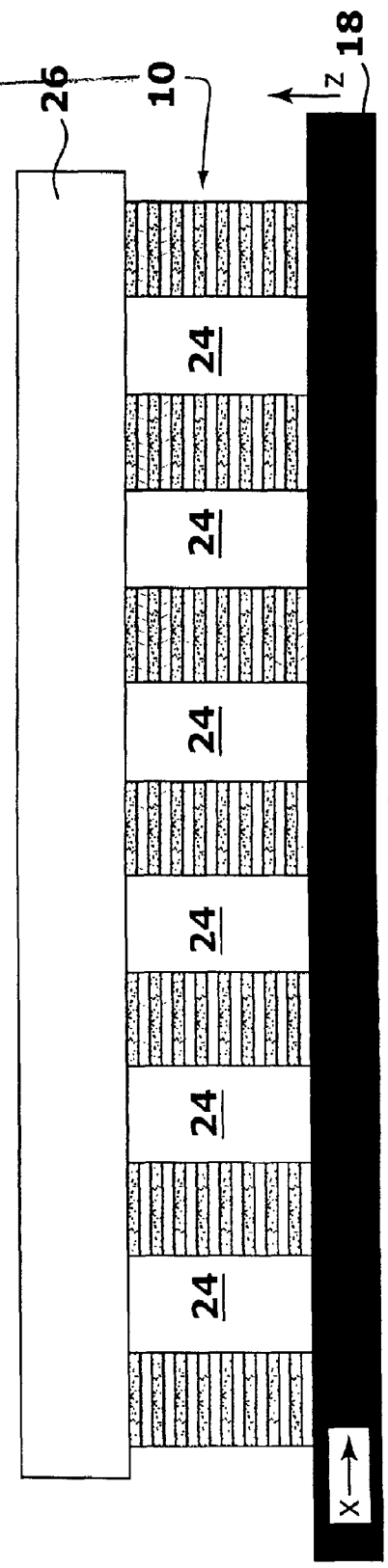

An air/fuel mixture is delivered to the fuel cell stacks and water and/or $CO_2$ removed via a manifold 26 shown in FIGS. 6A and B, which are side views perpendicular to one another. The air/fuel mixture is delivered to the stacks through channel 28, and water vapor and other exhaust are removed through channel 30. FIG. 6B shows the manifold closing the trenches 24 between the channels 28 and 30. For portable devices, a replaceable or rechargeable reservoir of fuel may be connected to channel 28. Such a reservoir may include a fuel reformer, depending upon the fuel. Exemplary fuel reformers are well known to those skilled in the art. The exhaust may be released to the environment or collected in a container which may be emptied or removed as needed. Use of a condenser to remove water vapor from the exhaust stream will reduce the amount of gas in such a container.

Figure 7:
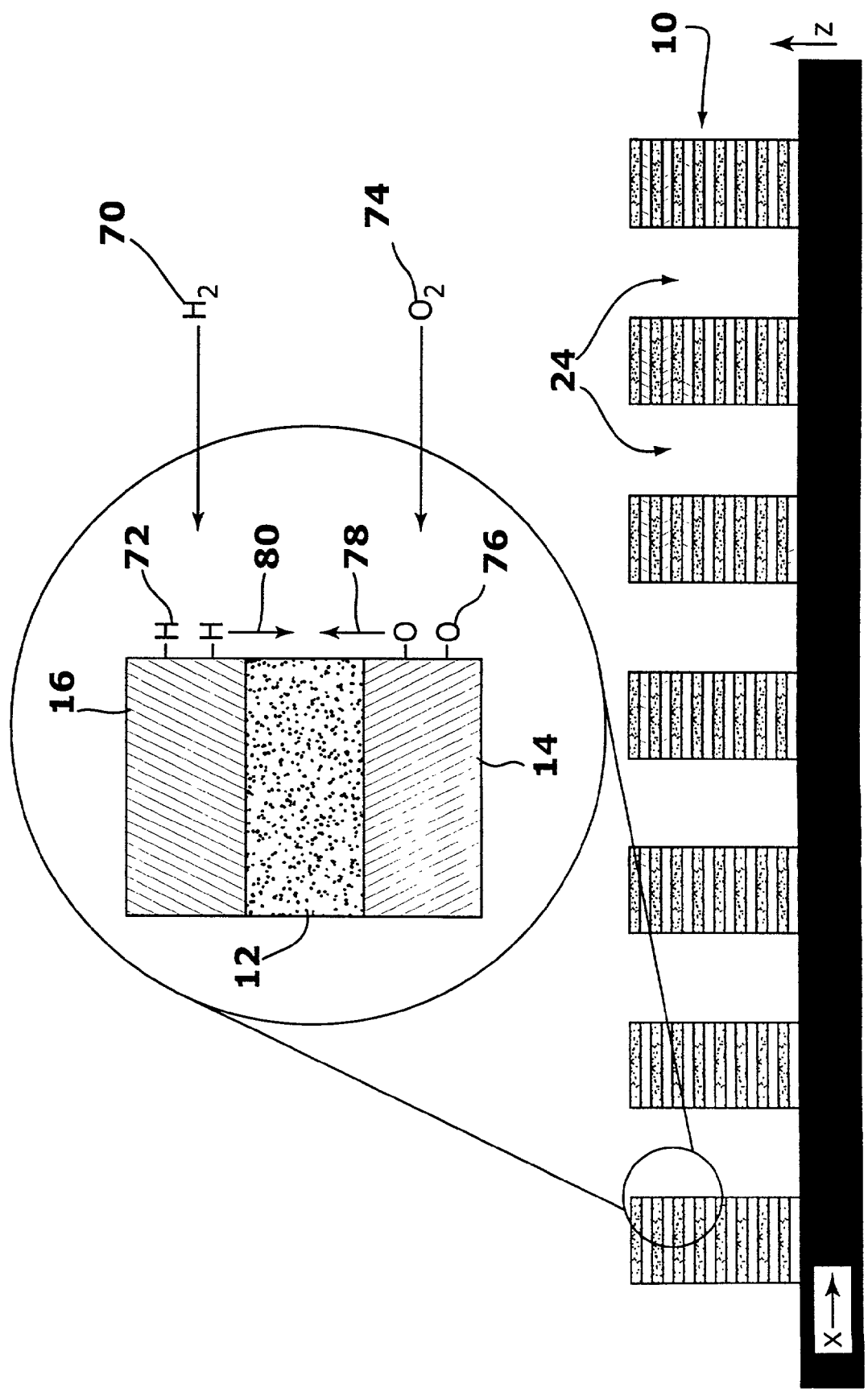
FIG. 7 is an exploded view of the fuel cell stack of FIG. 4, showing the diffusion path for oxygen ions and protons during power generation.

As shown in FIG. 7, fuel circulating through the trenches 24 adsorbs onto the catalytically selective anode 16, which catalyzes decomposition of dihydrogen 70 or other fuel (e.g., hydrocarbon, ammonia, etc.) to protons 72 or other species. Oxygen gas 74 adsorbs onto the catalytically selective cathode 14 and is decomposed into oxygen ions 76. The ions diffuse across the surface of the electrolyte 12. Because of the short diffusion distance resulting from the nanometer scale thickness of the electrolyte layer and the high dielectric constant of the electrolyte 12, the oxygen ions migrate 78 from the cathode 14 to the anode 16, and the protons migrate 80 from the anode 16 to the cathode 14, with an extremely low ionic impedance. Where the protons and oxygen ions recombine depends on the composition of the electrolyte and the different diffusion rates of the oxygen and protons but does not affect fuel cell performance.

Figure 8:
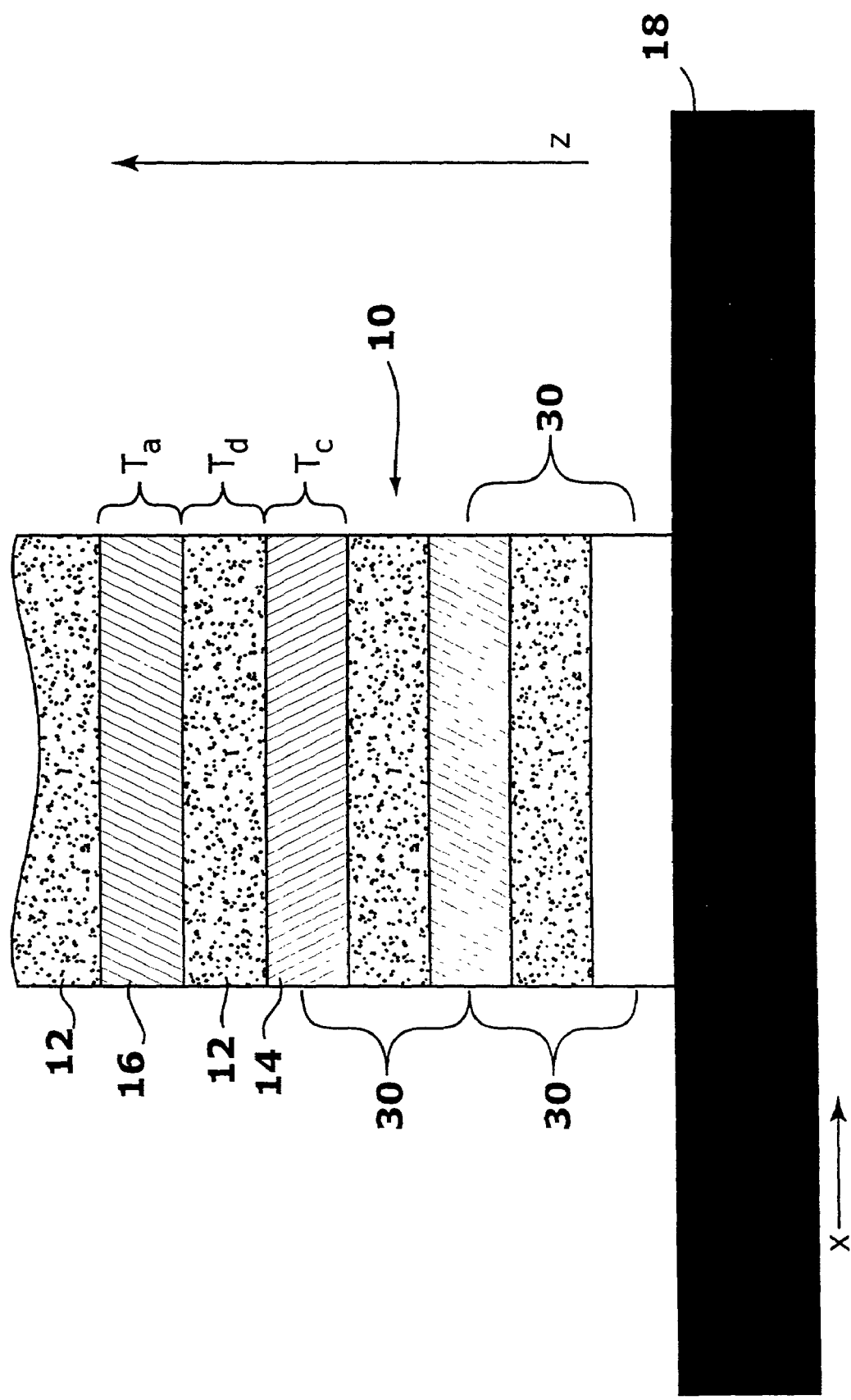
FIG. 8 is a side view of a portion of single fuel cell stack in parallel according to an embodiment of the invention, showing the layering of the cathode, anode, and electrolyte layers.

FIG. 8 is an exploded view of the lower portion of stack 10. The stack includes a plurality of primitive elements 30, each of which includes a sandwich of anode film 16, electrolyte film 12, and cathode film 14. Adjacent primitive elements 30 are flipped with respect to one another, and each of the catalytic films within the stack 10 is included in two adjacent primitive elements 30, so that the number N of unit cells in the stack is equal to the number of electrolyte layers 12, but not to the number of anode and cathode layers. The total catalytic surface area is given by the following equation:

$$N \times 2 \times C \times (T_{anode} + T_{cathode}) \times L = \text{catalytic surface area}$$

where C is the number of channels, $T_{anode}$ is the thickness of the anode layer, $T_{cathode}$ is the thickness of the cathode layer, and L is the length of the channel. In one embodiment with 10 unit cells and 10,000 channels/cm, the thickness of each film is 50 nm, and the length of the channels is 1 cm. The total catalytic surface area is 2 cm², twice the total surface area of the substrate under the stack 10 ($L^2 = 1$ cm²), but the height of the stack 10 is only about 1μm. The catalytic surface area increases the number of oxygen ions and protons available to spillover onto the electrolyte film 12. These spillover species (oxygen ions and protons) can diffuse across the surface of the electrolyte, increasing the efficiency of the fuel cell with respect to a fuel cell that relies on bulk diffusion. In one embodiment, the ionic flux due to surface diffusion is at least 10×, 100×, or 1000× higher than that due to bulk diffusion, which will significantly reduce the contribution of ionic diffusion to impedance and make catalytic efficiency the limiting factor in fuel cell operation.

The design of the fuel cell simplifies manufacturing while increasing efficiency and performance. Because neither the electrode nor the electrolyte layers is required to be porous, the cell has increased mechanical stability despite the use of thin layers. Even though the electrode layers are preferably dense, rapid diffusion frees up catalytic sites faster than if the device relied on bulk diffusion. In addition to reducing diffusion lengths, the thin electrolyte layers reduce manufacturing cost and times. In one embodiment of the present invention, the electrolyte layer may be as thin as 50 nm or less, reducing deposition times to about 2 minutes for each layer. In addition, the dominance of surface diffusion over bulk diffusion eliminates the need for bipolar plates in the stack. Instead, the current collectors 22 and 23 are integrated directly into the anode and cathode catalytic layers that connect to the collector bases 20 and 21.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A fuel cell, comprising:
   a plurality of alternating cathode and anode layers separated by electrolyte layers and a plurality of trenches perpendicular to a longitudinal axis of the plurality of layers,
   wherein the electrolyte layer is sufficiently thin that surface diffusion is the predominant mode of ionic transport, and
   wherein the cathode layers, anode layers, and electrolyte layers are in fluidic communication with one another.

2. The fuel cell of claim 1, further comprising first and second current collectors in electrical communication with the anode and cathode layers, respectively.

3. A fuel cell, comprising:
   a plurality of alternating cathode layers and anode layers separated by, and on opposite sides of, electrolyte layers,
   a plurality of trenches perpendicular to a longitudinal axis of, and defined by, the alternating plurality of cathode, anode and electrolyte layers such that the trenches have opposing sides and the plurality of cathode, anode and electrolyte layers are exposed at each of the opposing sides, and
   first and second current collectors in electrical communication with the anode and cathode layers, respectively,
   wherein the electrolyte layer is sufficiently thin that surface diffusion is the predominant mode of ionic transport, and
   wherein the first current collector is embedded into the anode layers and the second current collector is embedded into the cathode layers.

4. A fuel cell, comprising:
   a plurality of alternating cathode layers and anode layers separated by, and on opposite sides of, electrolyte layers,
   a plurality of trenches perpendicular to a longitudinal axis of, and defined by, the alternating plurality of cathode, anode and electrolyte layers such that the trenches have opposing sides and the plurality of cathode, anode and electrolyte layers are exposed at each of the opposing sides, and
   first and second current collectors in electrical communication with the anode and cathode layers, respectively
   wherein the electrolyte layer is sufficiently thin that surface diffusion is the predominant mode of ionic transport, and
   wherein the first current collector is disposed between the anode layers and corresponding adjacent electrolyte layers and the second current collector is disposed between the cathode layers and corresponding electrolyte layer.

5. The fuel cell of claim 2, further comprising a first current collector base in mechanical communication with the first current collector and a second current collector base in mechanical communication with the second current collector, wherein the mechanical communication is provided by a transition region having a slope.

6. The fuel cell of claim 5, wherein the electrolyte layer comprises first and second edges, and wherein the first and second edges of the electrolyte layer are disposed within the transition layer and comprise a slope.

7. The fuel cell of claim 1, wherein the electrolyte comprises a member of an oxygen ion conducting membrane and a protonic conductor.

8. The fuel cell of claim 7, wherein the electrolyte comprises a member of a cubic fluorite structure, a doped cubic fluorite, a proton-exchange polymer, and a proton-exchange ceramic.

9. The fuel cell of claim 8, wherein the electrolyte comprises a ceramic selected from 8 mole % yttria-stabilized zirconia, 20 mole % samarium doped-ceria, and $La_{0.9}Sr_{0.1}Ga_{0.8}Mg_{0.2}O_3$.

10. The fuel cell of claim 1, wherein the electrodes are a member of porous or dense.

11. A fuel cell, comprising:
a cathode film having a side surface;
an anode film having a side surface;
an electrolyte film disposed between the cathode film and the anode film and having a side surface, wherein:
the anode, cathode, and electrolyte side surfaces are coplanar,
protons generated at the anode diffuse along a member of the anode side surface, the electrolyte side surface, and both towards the cathode side surface,
oxygen ions generated at the cathode diffuse along a member of the cathode side surface, the electrolyte side surface, and both towards the anode side surface, and
an ionic flux due to surface diffusion of ions is at least 9 times greater than an ionic flux due to bulk diffusion of ions.

12. The fuel cell of claim 11, wherein the ionic flux due to surface diffusion of ions is at least 100 times greater than an ionic flux due to bulk diffusion of ions.

13. The fuel cell of claim 12, wherein the ionic flux due to surface diffusion of ions is at least 1000 times greater than an ionic flux due to bulk diffusion of ions.

14. The fuel cell of claim 11, further comprising a plurality of alternating cathode and anode films separated by electrolyte films.

15. The fuel cell of claim 14, comprising a plurality of elongated layers of alternating cathode and anode films separated by electrolyte films and a plurality of trenches perpendicular to a longitudinal axis of the plurality of layers.

16. An electrical device, comprising:
the fuel cell of claim 15;
a manifold having an inlet and an outlet, wherein fluid passing through the inlet may travel among the plurality of elongated layers to the outlet; and
a supply of fuel in fluidic communication with the inlet.

17. The device of claim 16, wherein the source of fuel is a reservoir characterized by a member of replaceable and rechargeable.

18. The device of claim 16, further comprising a condenser and an exhaust storage container in fluidic communication with the outlet.

19. A fuel cell, comprising:
a plurality of alternating cathode and anode layers and a plurality of trenches perpendicular to a longitudinal axis of the plurality of layers, wherein each of the plurality of trenches provides fluidic communication between at least one cathode layer and one anode layer; and
means for conducting ions between the anode layer and the cathode layer, wherein an ionic impedance associated with bulk diffusion is greater than that associated with surface diffusion.

20. The fuel cell of claim 19, wherein the means for conducting comprise an electrolyte surface, wherein an ionic flux due to surface diffusion is at least 10 times greater than an ionic flux due to bulk diffusion.

* * * * *